United States Patent
Matsuo

(10) Patent No.: US 9,056,968 B2
(45) Date of Patent: Jun. 16, 2015

(54) DEGRADATION PROMOTER OF BIODEGRADABLE RESIN MOLDED BODY, AND USE THEREOF

(75) Inventor: Atsushi Matsuo, Osaka (JP)

(73) Assignee: Kobayashi Pharmaceutical Co., Ltd., Osaka-shi (JP)

( * ) Notice: Subject to any disclaimer, the term of this patent is extended or adjusted under 35 U.S.C. 154(b) by 63 days.

(21) Appl. No.: 13/634,424

(22) PCT Filed: Mar. 25, 2011

(86) PCT No.: PCT/JP2011/057381
§ 371 (c)(1),
(2), (4) Date: Sep. 12, 2012

(87) PCT Pub. No.: WO2011/125548
PCT Pub. Date: Oct. 13, 2011

(65) Prior Publication Data
US 2013/0018125 A1    Jan. 17, 2013

(30) Foreign Application Priority Data

Mar. 31, 2010  (JP) ................................ 2010-082451

(51) Int. Cl.
*C08L 23/00* (2006.01)
*C09K 3/00* (2006.01)
*C08K 3/10* (2006.01)
*C08L 101/16* (2006.01)
*C08K 3/00* (2006.01)
*C08K 3/16* (2006.01)

(52) U.S. Cl.
CPC ............. *C08L 101/16* (2013.01); *C08K 3/0025* (2013.01); *C08K 3/16* (2013.01)

(58) Field of Classification Search
CPC ....... C08L 101/16; C08K 3/0025; C08K 3/16

USPC ............................ 523/124; 524/359, 398, 413
See application file for complete search history.

(56) References Cited

U.S. PATENT DOCUMENTS

| | | | | |
|---|---|---|---|---|
| 3,928,268 A | * | 12/1975 | Sato et al. ...................... | 523/125 |
| 2002/0188041 A1 | * | 12/2002 | Bond et al. ...................... | 524/47 |

FOREIGN PATENT DOCUMENTS

| JP | 49-119972 A | 11/1974 |
|---|---|---|
| JP | 05-065420 A | 3/1993 |
| JP | 07-502221 A | 3/1995 |
| JP | 2002-542313 A | 12/2002 |
| JP | 2009-542871 A | 12/2009 |
| WO | WO-93/11941 A2 | 6/1993 |
| WO | WO-00/59996 A1 | 10/2000 |
| WO | WO-2008/006493 A1 | 1/2008 |

OTHER PUBLICATIONS

International Search Report dated Jun. 14, 2011, issued for PCT/JP2011/057381.

* cited by examiner

*Primary Examiner* — Kriellion Sanders
(74) *Attorney, Agent, or Firm* — Locke Lord LLP; James E. Armstrong, IV; Nicholas J. DiCeglie, Jr.

(57) ABSTRACT

An object of the present invention is to provide a technique for increasing the biodegradation rate of the biodegradable resin molded body in nature by promoting degradation of a biodegradable resin molded body containing an oxidative degradation agent.

The degradation rate of the biodegradable resin molded body containing an oxidative degradation agent can be significantly increased by allowing both the biodegradable resin molded body and a chloride salt to be present at the time of disposal of the resin molded body.

20 Claims, 2 Drawing Sheets

DEGRADATION PROMOTER OF BIODEGRADABLE RESIN MOLDED BODY, AND USE THEREOF

CROSS REFERENCE TO RELATED APPLICATIONS

This application is related to co-pending application: "BIODEGRADABLE DISPOSABLE HAND WARMER" filed even date herewith in the name of Atsushi Matsuo, as a national stage application of International Application No. PCT/JP 2011/057380, filed Mar. 25, 2011, which application is assigned to the assignee of the instant application and which co-pending application is also incorporated by reference herein.

TECHNICAL FIELD

The present invention relates to a degradation promoter of a biodegradable resin molded body containing an oxidative degradation agent, the degradation promoter being capable of promoting the degradation of the biodegradable resin molded body. The present invention also relates to a biodegradable product having excellent biodegradability. Further, the present invention relates to a degradation method of a biodegradable resin molded body containing an oxidative degradation agent, the method being capable of efficiently degrading the biodegradable resin molded body.

BACKGROUND ART

Resin molded bodies produced from petroleum-based resin such as polyethylene, polypropylene, and polystyrene are used in various fields of fiber products, packaging films, electric appliances, industrial materials, and the like; and they are essential in modern society. However, these resin molded products are used and disposed in large amounts; the disposal of such products is a big problem. For example, there is a problem such that the incineration disposal of the resin molded body generates poisonous gas. Moreover, since petroleum-based resin has hydrolysis resistance, the resin molded body is not biodegraded in soil when disposed in landfills or in fields or mountains, thus resulting in an adverse effect on the environment.

Recently, hydrolyzable biodegradable resin such as polylactic acid is attracting attention as a substitute for petroleum-based resin. When disposed in landfills or in fields or mountains, such biodegradable resin is degraded by microorganisms without destroying the natural environment. The hydrolyzable biodegradable resin is known as an earth-friendly material; however, it is known to have low formability compared to petroleum-based resin. Further, since the biodegradable resin is easily depolymerized by hydrolysis, such resin has poor durability, strength, and heat resistance. Therefore, in the conventional technique, the use of the biodegradable resin in place of petroleum-based resin is limited to specific product fields.

On the other hand, an oxidative degradation agent that depolymerizes a resin material by oxidative degradation has been recently developed (Patent Literature 1). When a biodegradable resin molded body containing such a degradation agent is disposed in landfills or like places, it is depolymerized by oxidative degradation, and thereafter spontaneously degraded through microbial degradation. Since the degradation agent can also be applied to petroleum-based resin having high strength (hydrolysis-resistant material), biodegradability can be attained while keeping the advantages of petroleum-based resin, such as formability, durability, strength, and heat resistance. Thus, the degradation agent is attracting great attention. However, although it is important for waste treated in landfills, etc., to increase the degradation rate to reduce the burden on the environment to the extent possible, a technique of improving the degradation rate of a biodegradable resin molded body containing such a degradation agent has not yet been fully studied.

CITATION LIST

Patent Literature

PTL 1: Japanese Unexamined Patent Publication No. 2002-542313

SUMMARY OF INVENTION

Technical Problem

An object of the present invention is to provide a technique for increasing the biodegradation rate of a biodegradable resin molded body containing an oxidative degradation agent in nature by promoting degradation of the biodegradable resin molded body.

Solution to Problem

The present inventors conducted extensive research to achieve the above object, and found that the degradation rate of a biodegradable resin molded body containing an oxidative degradation agent is significantly increased by allowing both the biodegradable resin molded body and a chloride salt to be present at the time of disposal of the biodegradable resin molded body. The present invention was achieved by conducting further studies based on this finding.

Specifically, the present invention provides the following techniques.

Item 1. A degradation promoter of a biodegradable resin molded body comprising an oxidative degradation agent, the degradation promoter comprising a chloride salt as an effective component.

Item 2. The degradation promoter according to Item 1, wherein the chloride salt is potassium chloride and/or sodium chloride.

Item 3. The degradation promoter according to Item 1 or 2, wherein a resin forming the biodegradable resin molded body is polyolefin.

Item 4. The degradation promoter according to any one of Items 1 to 3, wherein the oxidative degradation agent is at least one member selected from the group consisting of carboxylic acid metal salts, hydroxycarboxylic acids, transition metal compounds, rare earth compounds, and aromatic ketones.

Item 5. A resin molded body degradation agent comprising an oxidative degradation agent and a chloride salt as effective components, the degradation agent being used as an additive for a resin molded body.

Item 6. A biodegradable product comprising the degradation promoter according to any one of Items 1 to 4 and a biodegradable resin molded body comprising an oxidative degradation agent.

Item 7. A biodegradation promoting resin molded body comprising the degradation agent according to Item 5.

Item 8. A method for degrading a biodegradable resin molded body comprising an oxidative degradation agent, comprising allowing the biodegradable resin molded body to be present with the degradation promoter according to any one of Items 1 to 4 to degrade the biodegradable resin molded body.

Item 9. Use of a chloride salt for the production of a degradation promoter of a biodegradable resin molded body comprising an oxidative degradation agent.

Item 10. Use of an oxidative degradation agent and a chloride salt for the production of a resin molded body degradation agent.

Item 11. A method for promoting degradation of a biodegradable resin molded body comprising an oxidative degradation agent, the method comprising the step of treating the biodegradable resin molded body in the presence of a chloride salt.

Item 12. A method for degrading a biodegradable resin molded body comprising an oxidative degradation agent, the method comprising the step of treating the biodegradable resin molded body in the presence of a chloride salt.

Item 13. A degradation method for degrading a biodegradation promoting resin molded body comprising an oxidative degradation agent and a chloride salt, the method comprising the step of allowing the biodegradation promoting resin molded body to stand in outdoor environments.

Advantageous Effects of Invention

According to the degradation promoter of the present invention, the degradation of a biodegradable resin molded body containing an oxidative degradation agent can be effectively promoted. Therefore, biodegradation can be accelerated without causing environmental pollution when the biodegradable resin molded body is disposed in landfills or in fields or mountains after use.

Further, when the degradation agent of the present invention is added to a resin molded body, the degradation of the resin molded body is promoted at the time of disposal, and the resin molded body is rapidly depolymerized to an extent such that the resin molded body can be used by microorganisms. Thus, rapid spontaneous degradation is ensured without resulting in an adverse effect on the environment.

DESCRIPTION OF EMBODIMENTS

Figure 1:
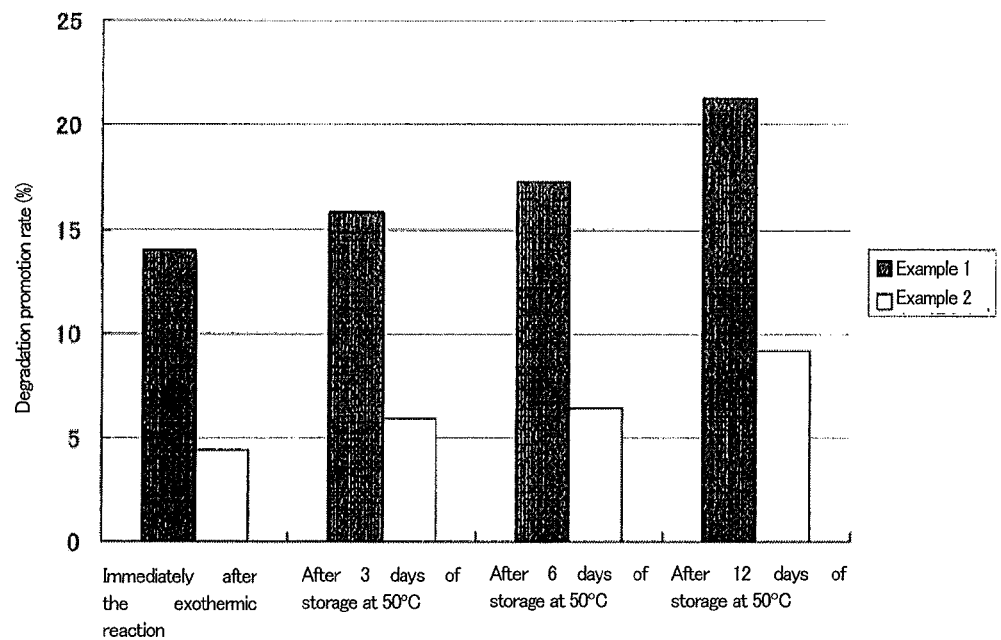
FIG. 1 shows the results of measuring the degradation promotion rate of biodegradable resin molded bodies (inner bags) in the biodegradable products (disposable body warmers) of Examples 1 and 2 in Test Example 1.

1. Degradation Promoter of Biodegradable Resin Molded Body

The degradation promoter of the present invention has a feature in that it is used for promoting the degradation of a biodegradable resin molded body containing an oxidative degradation agent, and it contains a chloride salt as an effective component.

Specific examples of the chloride salt used in the present invention include alkali metal chloride salts such as potassium chloride, sodium chloride, and lithium chloride; alkaline earth metal chloride salts such as magnesium chloride and calcium chloride; and metal chlorides such as aluminum chloride, copper chloride, ferric chloride, zinc chloride, and thallium chloride. Of these, to further promote the degradation of a biodegradable resin molded body containing an oxidative degradation agent, alkali metal chloride salts are preferable, potassium chloride and sodium chloride are more preferable, and potassium chloride is particularly preferable. Such chloride salts can be used singly, or in a combination of two or more.

The degradation promoter of the present invention is used for promoting the degradation of a biodegradable resin molded body containing an oxidative degradation agent.

A resin contained in a biodegradable resin molded body to which the degradation promoter of the present invention is applied is not particularly limited, as long as it includes an oxidative degradation agent; however, a thermoplastic resin is preferable. Specific examples of the thermoplastic resin include polyolefin (e.g., polyethylene and polypropylene), polystyrene, polyvinyl chloride, polyvinylidene chloride, polyamide, polyester, polyvinyl alcohol, polyurethane, ethylene-vinylacetate copolymer, polycarbonate, and the like. These thermoplastic synthetic resins can be used singly, or in a combination of two or more.

Of these, resins having hydrolysis resistance, such as polyolefin (e.g., polyethylene and polypropylene), polystyrene, polyvinyl chloride, polyvinylidene chloride, and polyamide are preferable, polyolefin is more preferable, and polyethylene and polypropylene are even more preferable. Although these thermoplastic resins alone are not degraded in nature, they are oxidatively degraded in a more efficient manner in the presence of both an oxidative degradation agent and the degradation promoter of the present invention. Thus, the resins are depolymerized to an extent such that microbial degradation can be performed.

The shape of the biodegradable resin molded body to which the degradation promoter of the present invention is applied is not particularly limited. Any shapes such as sheets, films, pellets, blocks, and fibers can be used.

In the present invention, an oxidative degradation agent is a material that oxidatively degrades a polymer forming a resin, thereby depolymerizing the polymer to an extent such that microbial degradation can be performed. The oxidative degradation agent is known in this technical field (for example, U.S. Pat. Nos. 3,840,512, 3,994,855, 4,101,720, 4,156,666, 4,256,851, 4,360,60, 4,461,853, 4,476,255, 4,517, 318, 4,931,488, 4,983,645, 5,096,939, 5,308,906, 5,565,503, and 5,854,304; and WO88/09354, WO92/11298, WO94/13735, WO00/59996, and the like). The oxidative degradation agent contained in the resin molded body to which the degradation promoter of the present invention is applied is not particularly limited. Examples thereof include carboxylic acid metal salts, hydroxycarboxylic acids, transition metal compounds (U.S. Pat. No. 5,308,906), rare earth compounds, aromatic ketones, and the like. Other usable oxidative degradation agents include combinations of carboxylic acid metal salts and hydroxycarboxylic acids (U.S. Pat. No. 5,854,304), combinations of carboxylic acid metal salts and fillers (U.S. Pat. No. 5,565,503), and the like. In the present invention, these oxidative degradation agents can be used singly, or in a combination of two or more.

As the carboxylic acid metal salt used as the oxidative degradation agent, metal salts of aliphatic carboxylic acids having 10 to 20 carbon atoms are preferable, and metal stearate is more preferable. Examples of a metal atom constituting the carboxylic acid metal salt include cobalt, cerium, iron, aluminum, antimony, barium, bismuth, cadmium, chromium, copper, gallium, lanthanum, lead, lithium, magnesium, mercury, molybdenum, nickel, calcium, rare earth, silver, sodium, strontium, tin, tungsten, vanadium, yttrium, zinc, zirconium, and the like. As a carboxylic acid metal salt used as an oxidative degradation agent, stearates of metals such as cobalt, cerium, and iron are particularly preferable.

Examples of the hydroxycarboxylic acid used as an oxidative degradation agent include monohydroxy tricarboxylic acids such as citric acid; polyhydroxy dicarboxylic acids such as trihydroxy glutaric acid and saccharic acid; dihydroxydicarboxylic acids such as tartaric acid; monohydroxydicarboxylic acids such as tartronic acid and malic acid; polyhydroxy monocarboxylic acids such as erythric acid, arabic acid, and mannitic acid; dihydroxymonocarboxylic acids such as glyoxylic acid and glyceric acid; and the like. These hydroxycarboxylic acids can be used singly, or in a combination of two or more.

Examples of the filler used as one component of the oxidative degradation agent include inorganic carbonate, synthetic carbonate, nepheline syenite, talc, magnesium hydroxide, aluminum hydroxide, diatomaceous earth, natural or synthetic silica, calcined clay, and the like. It is desirable that these fillers have a particle diameter of less than 150 meshes. The fillers can be used singly, or in a combination of two or more.

Examples of the transition metal compound used as an oxidative degradation agent include salts of cobalt or magnesium, preferably aliphatic carboxylic acid ($C_{12}$ to $C_{20}$) salts of cobalt or magnesium, and more preferably cobalt stearate, cobalt oleate, magnesium stearate, and magnesium oleate. These transition metal compounds can be used singly, or in a combination of two or more.

Examples of rare earth compounds used as an oxidative degradation agent include rare earths belonging to periodic table Group 3A, and oxides thereof. Specific examples thereof include cerium (Ce), yttrium (Y), neodymium (Nd), rare earth oxides, hydroxides, rare earth sulfates, rare earth nitrates, rare earth acetates, rare earth chlorides, rare earth carboxylates, and the like. More specific examples thereof include cerium oxide, ceric sulfate, ceric ammonium sulfate, ceric ammonium nitrate, cerium acetate, lanthanum nitrate, cerium chloride, cerium nitrate, cerium hydroxide, cerium octylate, lanthanum oxide, yttrium oxide, scandium oxide, and the like. These rare earth compounds may be used singly, or in a combination of two or more.

Examples of aromatic ketones used as an oxidative degradation agent include benzophenone, anthraquinone, anthrone, acetylbenzophenone, 4-octylbenzophenone, and the like. These aromatic ketones may be used singly, or in a combination of two or more.

From the viewpoint of further promoting the degradation of a biodegradable resin molded body using the degradation promoter of the present invention, the biodegradable resin molded body, which is an application object, preferably contains a combination of a carboxylic acid salt and a rare earth compound as an oxidative degradation agent. A preferable example of an oxidative degradation agent used in the present invention is "P-Life" (tradename, produced by P-Life Japan Inc.).

When a carboxylic acid salt and a rare earth compound are used in combination as an oxidative degradation agent, the proportion thereof is such that the rare earth compound is 5 to 70 parts by mass, preferably 7 to 60 parts by mass, and more preferably 10 to 50 parts by mass, per 100 parts by mass of the carboxylic acid salt.

An oxidative degradation agent generally oxidatively degrades, under the action of light, heat, air, etc., a polymer that forms a resin molded body to depolymerize the polymer to such an extent that microbial degradation can be carried out. In the present invention, among oxidative degradation agents, an oxidative degradation agent that exerts its effects on oxidative degradation of a polymer upon exposure to light (ultraviolet light) (hereinafter referred to as a "light-requiring oxidative degradation agent") is preferably used. A biodegradable resin molded body comprising a light-requiring oxidative degradation agent is not degraded under shaded conditions. Therefore, by keeping the biodegradable resin molded body in a shaded atmosphere (e.g., in a shaded space, a light-resistant container, or a light-proof bag) in the pre-use stage, i.e., during production, distribution, and storage, the biodegradable resin molded body can maintain desired functions without causing durability deterioration until use. Examples of such light-requiring oxidative degradation agents include an oxidative degradation agent containing a rare earth compound. More specifically, "P-life" (tradename, produced by P-Life Japan Inc.) is exemplified.

In the present invention, the proportion of the oxidative degradation agent in the biodegradable resin molded body, which is an application object of the present invention, is suitably determined depending on, for example, the type of the oxidative degradation agent and the type of the resin forming the biodegradable resin molded body. For example, an oxidative degradation agent may be used in an amount of 0.05 to 5 mass %, preferably 0.1 to 3.5 mass %, and still more preferably 0.1 to 2.4 mass %, based on the total mass of the biodegradable resin molded body.

More specifically, in a case where a biodegradable resin molded body is in the shape of fiber such as woven or nonwoven fabric, an oxidative degradation agent is used, for example, in an amount of 0.08 to 0.8 mass %, preferably 0.12 to 0.6 mass %, and more preferably 0.16 to 0.4 mass %, based on the total mass of the biodegradable resin molded body. In a case where a biodegradable resin molded body has a film- or sheet-like shape, an oxidative degradation agent is used, for example, in an amount of 0.4 to 3 mass %, preferably 0.6 to 2.5 mass %, and more preferably 0.8 to 2 mass %, based on the total mass of the biodegradable resin molded body.

A biodegradable resin molded body, which is an application object of the present invention, can be produced by a known method. For example, a production method including the following procedures is exemplified: (1) a predetermined amount of oxidative degradation agent is added to a molten resin for forming a biodegradable resin molded body, and the molten mixture is formed into pellets; (2) subsequently, the pellets are melted and formed into a desired shape.

The application method of the degradation promoter of the present invention is not particularly limited, as long as the degradation promoter is applied to contact the biodegradable resin molded body at the time of disposal of the biodegradable resin molded body. Examples of the application method include a method in which, at the time of the disposal of the biodegradable resin molded body, the effective component of the degradation promoter of the present invention is added without any treatment, or if necessary, added after dilution using a dilution medium in water, etc., to the biodegradable resin molded body (hereinafter sometimes referred to as embodiment 1); and a method in which, in the production of a product containing the biodegradable resin molded body, the effective component of the degradation promoter of the present invention is added to the product beforehand, thereby bringing the biodegradable resin molded body into contact with the effective component (hereinafter sometimes referred to as embodiment 2).

The application method of embodiment 1 is preferably used when a biodegradable resin molded body is used in a product that requires long-term durability, or when a biodegradable resin molded body is used in a product in which the effective component of the degradation promoter of the present invention cannot be added beforehand.

The application method of embodiment 2 is preferably used when a biodegradable resin molded body is used in a product to which the effective component of the degradation promoter of the present invention can be added beforehand, and the product does not require long-term durability. Examples of the product to which embodiment 2 can be applied include products in which a functional composition is surrounded by or laminated on a sheet-like or film-like biodegradable resin molded body. In the present specification, a functional composition is a composition with specific effects such as a refrigerant effect, cooling effect, pharmacological effect, and exothermic effect. A person skilled in the art can suitably determine the contents of the functional composition according to a desired effect, and the like.

Specifically, in embodiment 2, the effective component of the degradation promoter of the present invention may be added to the functional composition, and the mixture may be surrounded by or laminated on a sheet-like or film-like biodegradable resin molded body to provide a product. Specific examples of the product to which embodiment 2 can be applied include refrigerants (products in which a refrigerant composition is surrounded by a sheet-like of film-like biodegradable resin molded body), body-cooling agents (products in which a cooling composition is surrounded by or laminated on a sheet-like or film-like biodegradable resin molded body), medical packing sheets (products in which a gel-like composition for packing sheets is laminated on a sheet-like or film-like biodegradable resin molded body), body heat-retaining agents (products in which a heat-generating composition is surrounded by a sheet-like or film-like biodegradable resin molded body), and the like.

The suitable amount of the degradation promoter of the present invention varies depending on the shape or kind of the biodegradable resin molded body. The amount of the effective component of the degradation promoter of the present invention is in a range satisfying 1 to 100 parts by mass, preferably 2.5 to 50 parts by mass, and more preferably 5 to 30 parts by mass, per 100 parts by mass of the biodegradable resin molded body.

By allowing the biodegradable resin molded body to stand in outdoor environments in the presence of the degradation promoter of the present invention (e.g., disposal in landfills or in fields or mountains), the biodegradable resin molded body is oxidatively degraded, and then undergoes microbial degradation. A period until when the biodegradable resin molded body is finally degraded in the presence of the degradation promoter of the present invention varies depending on the shape of the biodegradable resin molded body, kind of the structure resin, environment where the biodegradable resin molded body is discarded, and the like. However, it generally takes about 0.5 to 3 years to degrade about 1 g of a film-like or a sheet-like biodegradable resin molded body to a degree such that the resin molded body cannot be visually seen.

2. Resin Molded Body Degradation Agent

The degradation agent of the present invention is a resin molded body degradation agent having a feature in that it comprises an oxidative degradation agent and a chloride salt as effective components, and is used as an additive for a resin molded body. Thus, by using an oxidative degradation agent and a chloride salt in combination, and adding them to the resin molded body, degradation of the resin molded body is promoted, which allows rapid degradation of the resin molded body into low molecular compound(s) to an extent such that the resin molded body can be used by microorganisms.

The oxidative degradation agent and chloride salt used in the degradation agent of the present invention are the same as those described in the section "1. Degradation Promoter."

In the degradation agent of the present invention, the proportion of the oxidative degradation agent and the chloride salt is not particularly limited. For example, the chloride salt is contained in a total amount of about 4 to 2,800 parts by mass, preferably 10 to 2,600 parts by mass, and more preferably 50 to 2,400 parts by mass, per 100 parts by mass of the total amount of the oxidative degradation agent.

The degradation agent of the present invention is used as an additive for a resin molded body. The structure resin, shape, or the like of the resin molded body are the same as those of the biodegradable resin molded body described in the section "1. Degradation Promoter."

The degradation agent of the present invention can be added to a resin molded body according to a known method. For example, the following production method can be used: (1) A predetermined amount of the degradation agent of the present invention is added to a molten resin for forming a resin molded body, and the molten mixture is formed into pellets; (2) subsequently, the pellets are melted if necessary, and formed into a desired shape.

The amount of the degradation agent of the present invention added to the resin molded body is suitably determined according to the kind of the oxidative degradation agent and chloride salt in the degradation agent, kind of the resin molded body, etc. For example, the total amount of the degradation agent of the present invention is 0.1 to 7 parts by mass, preferably 0.15 to 5 parts by mass, and more preferably 0.2 to 3 parts by mass, per 100 parts by mass of the total amount of the resin molded body.

The resin molded body containing the degradation agent of the present invention is rapidly depolymerized through oxidative degradation by allowing it to stand in outdoor environments (e.g., disposal in landfills or in fields or mountains), and then degraded by microorganisms. A rough indication until when the resin molded body containing the degradation agent of the present invention is finally degraded is the same as the period until when the biodegradable resin molded body described in the section "1. Degradation Promoter" is degraded.

3. Biodegradable Product

The biodegradable product of the present invention has a feature in that it comprises the aforementioned degradation promoter and a biodegradable resin molded body containing an oxidative degradation agent. Specifically, the biodegradable product of the present invention contains the degradation promoter in combination with a biodegradable resin molded body containing an oxidative degradation agent. When the product is disposed in landfills or in fields or mountains without any treatment after use, the biodegradable resin molded body is rapidly degraded without causing environmental pollution.

The degradation promoter contained in the biodegradable product of the present invention is the same as those described in the section "1. Degradation Promoter."

The kind of the resin forming the biodegradable resin molded body contained in the biodegradable product of the present invention, the shape of the resin molded body, and the kind and the proportion of the oxidative degradation agent contained in the resin molded body are the same as those of the biodegradable resin molded body to which the promoter in the section "1. Degradation Promoter" is applied.

The proportion of the degradation promoter and the biodegradable resin molded body contained in the biodegradable product of the present invention is suitably determined according to the shape or kind of the biodegradable resin molded body. For example, the effective component (chloride salt) of the degradation promoter is contained in an amount of 5 to 55 parts by mass, preferably 10 to 50 parts by mass, and more preferably 15 to 45 parts by mass per 100 parts by mass of the biodegradable resin molded body.

The biodegradable product of the present invention comprises the degradation promoter and the biodegradable resin molded body. The product embodiment is not particularly limited, as long as the degradation promoter is in contact with the biodegradable resin molded body at the time of disposal. Specific examples of the biodegradable product of the present invention include products containing the biodegradable resin molded body and a composition containing the degradation promoter; preferably, products in which a functional composition containing the degradation promoter is surrounded by or laminated on a sheet-like or film-like biodegradable resin molded body. Specific examples of the biodegradable product of the present invention include refrigerants (products in which a refrigerant composition containing the degradation promoter is surrounded by a sheet-like of film-like biodegradable resin molded body), body-cooling agents (products in which a cooling composition containing the degradation promoter is surrounded by or laminated on a sheet-like or film-like biodegradable resin molded body), medical packing sheets (products in which a degradation-promoter-containing gel-like composition for packing sheets is laminated on a sheet-like or film-like biodegradable resin molded body), body heat-retaining agents (products in which a heat-generating composition containing the degradation promoter is surrounded by a sheet-like or film-like biodegradable resin molded body), and the like.

The biodegradable resin molded body is rapidly depolymerized through oxidative degradation by allowing it to stand in outdoor environments (e.g., disposal in landfills or in fields or mountains), and then degraded by microorganisms. A rough indication until when the biodegradable resin molded body in the biodegradable product of the present invention is finally degraded is the same as the period until when the biodegradable resin molded body described in the section "1. Degradation Promoter" is degraded.

4. Biodegradation Promoting Resin Molded Body

The biodegradation promoting resin molded body of the present invention has a feature in that it comprises a chloride salt and an oxidative degradation agent. Specifically, the biodegradation promoting resin molded body of the present invention is a resin molded body containing the degradation agent described in the section "2. Degradation Agent."

5. Degradation Method of Resin Molded Body

The degradation method of the present invention has a feature in that a biodegradable resin molded body containing an oxidative degradation agent is degraded in the presence of the aforementioned degradation promoter together with the biodegradable resin molded body. Specifically, the degradation method of the present invention is a method for degrading a biodegradable resin molded body containing an oxidative degradation agent using the aforementioned degradation promoter.

The degradation promoter used in the degradation method of the present invention, biodegradable resin molded body to be degraded, oxidative degradation agent contained in the biodegradable resin molded body, proportion of the degradation promoter and the biodegradable resin molded body, and method of allowing both the degradation promoter and the biodegradable resin molded body to be present are the same as those described in the section "1. Degradation Promoter."

In the degradation method of the present invention, the biodegradable resin molded body is degraded in the presence of the degradation promoter together with the biodegradable resin molded body by allowing the biodegradable resin molded body to stand indoors or outdoors, preferably in outdoor environments where microorganisms exist (e.g., disposal in landfills or in fields or mountains). The period until when the resin molded body is degraded by the degradation method of the present invention is the same as the period until when the biodegradable resin molded body described in the section "1. Degradation Promoter" is degraded.

EXAMPLES

The present inveniton is described below with reference to Examples. However, the scope of the invention is not limited to these Examples. The oxidative degradation agent-containing composition (with an oxidative degrntion agent content of 80 to 90%) used in the Examples and Comparative Examples is a product comercially available under the trade name "P-Life" (a product of P-Life Japan, Inc.; containing 50 to 70 wt % of an aliphatic monocarboxylic acid salt, 10 to 20 wt% of a rare earth compound, and 10 to 20 % of a lubricant).

Example 1

Preparation of Biodegradable Product (Disposable Body Warmer)

1. Preparation of Functional Composition (Exothermic Composition)

1 mass % of potassium chloride, 55 mass % of iron powder having an average particle diameter of 50 μm, 13 mass % of activated carbon having an average particle diameter of 200 μm, 26 mass % of water, 3 mass % of vermiculite having a particle diameter of 100 μm, and 2 mass % of a crosslinked partial sodium salt of an acrylic acid polymer having a particle diameter of 380 μm were mixed to prepare an exothermic composition.

2. Preparation of Resin Molded Body (Inner Bag Material of Disposable Body Warmer)

A resin sheet consisting of 98 mass % of polyethylene and 2 mass % of an oxidative degradation agent-containing material was brought into contact with a rotating roll comprising a row of disc-shaped members, each disc-shaped member having blades on the circumference, to prepare a breathable resin film (thickness: 40 μm) having fine pores with a size to achieve a value of about 13.5 to about 14.5 sec/100 cc when measured according to JIS P8117-1998 "Paper and Paperboard—Air Permeability Testing—the Gurley Method." Separately, a biodegradable nonwoven fabric (basis weight: 25 g/m$^2$) was produced by spunbonding using a synthetic fiber consisting of 99.75 mass % of polypropylene and 0.25 mass % of an oxidative degradation agent-containing material.

The biodegradable nonwoven fabric was laminated to the breathable resin film to prepare 1 g of a laminate 9.5 cm long and 120 cm wide (an inner bag; a laminate consisting of 0.7 g of the breathable, biodegradable resin film and 0.3 g of the biodegradable nonwoven fabric).

3. Preparation of Biodegradable Product (Disposable Body Warmer)

The exothermic composition prepared above was enclosed in the above-obtained laminate by three-side sealing. More specifically, the laminate obtained above was folded in two, and the portions about 7 mm from the outside were bonded together by thermocompression bonding at 130° C. Similarly, at one of the upper and lower opening ends, the portions about 7 mm from the outside were bonded together by thermocompression bonding at 130° C. Subsequently, after 20 g of the exothermic composition prepared above was inserted from the unbonded side of the inner bag, the portions about 7 mm from the outside of the unbound side were bonded together by thermocompression bonding at 130° C. to prepare a biodegradable product (a disposable body warmer). Next, the biodegradable product thus prepared was immediately placed into an (air-impermeable, light-blocking) outer bag comprising a polyvinylidene chloride coated film, and the outer bag was sealed. In the following Test Examples, at the beginning of the test, the disposable body warmer was removed from the outer bag, and used.

Example 2

Preparation of Biodegradable Product (Disposable Body Warmer)

A disposable body warmer was produced under the same conditions as in Example 1, except that 1 mass % of sodium chloride was used in place of 1 mass % of potassium chloride.

Test Example 1

Evaluation of Degradability of the Biodegradable Products (Disposable Body Warmers)

The disposable body warmers obtained in Examples 1 and 2 were removed from the outer bags, and allowed to stand at room temperature for 24 hours until the end of the exothermic reaction. Thereafter, the disposable body warmers in which the exothermic reaction was finished were placed in a 50° C. thermostatic chamber, and stored for 12 days.

Immediately after the end of the exothermic reaction; and after 3 days; after 6 days; and after 12 days of storage at 50° C., each disposable body warmer was disassembled to remove the exothermic composition therefrom. An unpunctured portion of the inner bag was cut to a size of 2 cm×7 cm, and tensioned in the MD using a tensile testing machine (AGS-H, a product of Shimadzu Corporation) to determine the tensile strength. As a control, an inner bag not containing the exothermic composition was used. After the control inner bag was stored under the same conditions as above, the tensile strength was measured. Subsequently, the degradation promotion rate of each of the inner bags used in Examples 1 and 2 was measured according to the mathematical formula shown below. The higher the inner bag degradation rate, the lower the tensile strength. Accordingly, tensile strength is an indicator generally used in this technical field to evaluate the degree of degradation of inner bags.

Degradation promotion rate(%)={(Tensile strength of the control−Tensile strength of the inner bag obtained in the Example)/Tensile strength of the control}×100   [Math. Formula 1]

FIG. 1 shows the results of measuring the inner bag degradation promotion rate of the disposable body warmers obtained in Examples 1 and 2. As is clear from FIG. 1, the inner bags of the disposable body warmers (biodegradable products) obtained in Examples 1 and 2 exhibited highly promoted degradation rates, compared to the inner bag assessed as the control. Additionally, it was confirmed that compared to the case where sodium chloride was contained (Example 2), the disposable body warmer containing an exothermic composition (functional composition) comprising potassium chloride (Example 1) exhibited a remarkably high inner bag degradation promotion rate, and thus had excellent biodegradability. The inner bags of the disposable body warmers obtained in Examples 1 and 2 were such that even after the end of the exothermic reaction, strength reduction that would result in problems during use, such as brittleness and leakage of the exothermic composition, was not observed, and the physical properties required of body warmers were maintained.

Examples 3 and 4

Biodegradable Products (Non-Exothermic Composition-Containing Products)

2.2 mass % of potassium chloride, 28.9 mass % of activated carbon having an average particle diameter of 200 μm, 57.8 mass % of water, 6.7 mass % of vermiculite having a particle diameter of 100 μm, and 4.4 mass % of a crosslinked partial sodium salt of an acrylic acid polymer having a particle diameter of 380 μm were mixed to prepare a non-exothermic composition (functional composition). Twenty grams of the obtained non-exothermic composition was enclosed in the same inner bag (biodegradable resin molded body) as that used in Example 1 to prepare a non-exothermic composition-containing product (Example 3).

Another non-exothermic composition-containing product (Example 4) was prepared under the same conditions as in Example 3, except that 2.2 mass % of sodium chloride was used in place of 2.2 mass % of potassium chloride.

Test Example 2

Evaluation of Degradability of the Biodegradable Products (Non-Exothermic Composition-Containing Products)

The non-exothermic composition-containing products obtained in Examples 3 and 4 were stored in a 50° C. thermostatic chamber for 3 days. After 1 day of storage and after 3 days of storage, the inner bag degradation promotion rate was measured in the same manner as in Test Example 1 above.

Figure 2:
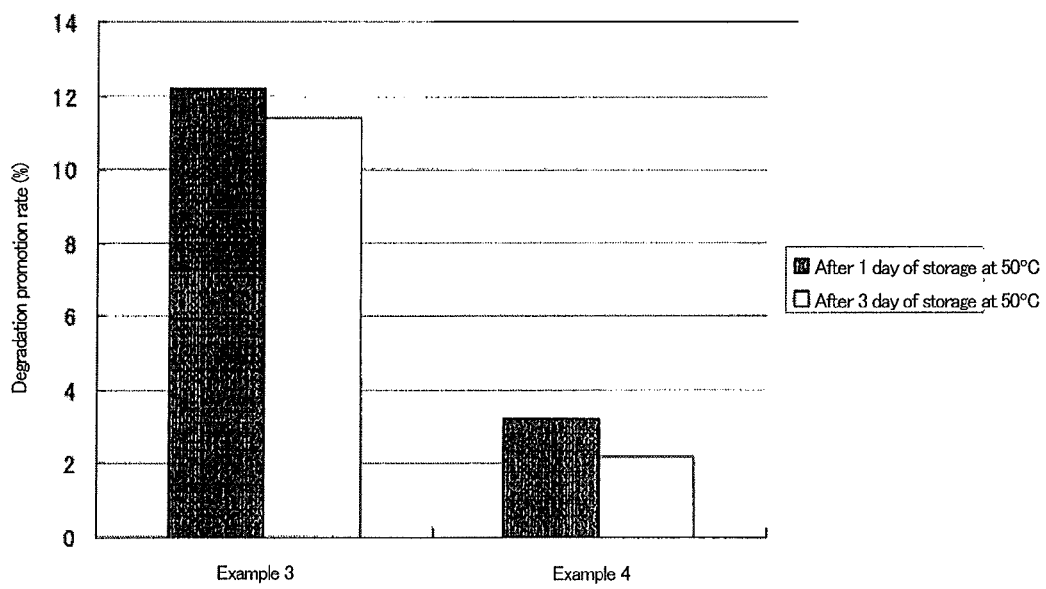
FIG. 2 shows the results of measuring the degradation promotion rate of biodegradable resin molded bodies (inner bags) in the biodegradable products (non-exothermic composition-containing products) of Examples 3 and 4 in Test Example 2.

FIG. 2 shows the obtained results. The results show that, as in Test Example 1 above, the potassium chloride- or sodium chloride-containing products (Examples 3 and 4) exhibited remarkably promoted inner bag (biodegradable resin molded body) degradation rates. In particular, the potassium chloride-containing product (Example 3) exhibited a remarkably high inner bag degradation promotion rate, compared to the case where sodium chloride was contained (Example 4). Considering the fact that the non-exothermic composition-containing products subjected to this test do not contain iron powder and thus do not produce heat even when in contact with air, it was confirmed that the degradation promotion of the inner bag comprising an oxidative degradation agent in the presence of potassium chloride or sodium chloride is not greatly influenced by the temperature.

Comparative Test Example 1

Evaluation (No. 2) of the Degradability of
Non-Exothermic Composition-Containing Products Non-exothermic composition-containing products were prepared under the same conditions as in Example 3, except that 2.2 mass % of potassium dihydrogen phosphate (Comparative Example 1), 2.2 mass % of magnesium sulfate (Comparative Example 2), 2.2 mass % of manganese sulfate (Comparative Example 3), and 2.2 mass % of potassium sulfate (Comparative Example 4), or 2.2 mass % of sodium sulfate (Comparative Example 5) was used in place of 2.2 mass % of potassium chloride.

After the non-exothermic composition-containing products obtained in Comparative Examples 1 to 5 were stored in a 50° C. thermostatic chamber for 1 day, the degradation promotion rate of each inner bag (resin molded body) was measured in the same manner as in Test Example 1 above.

Figure 3:
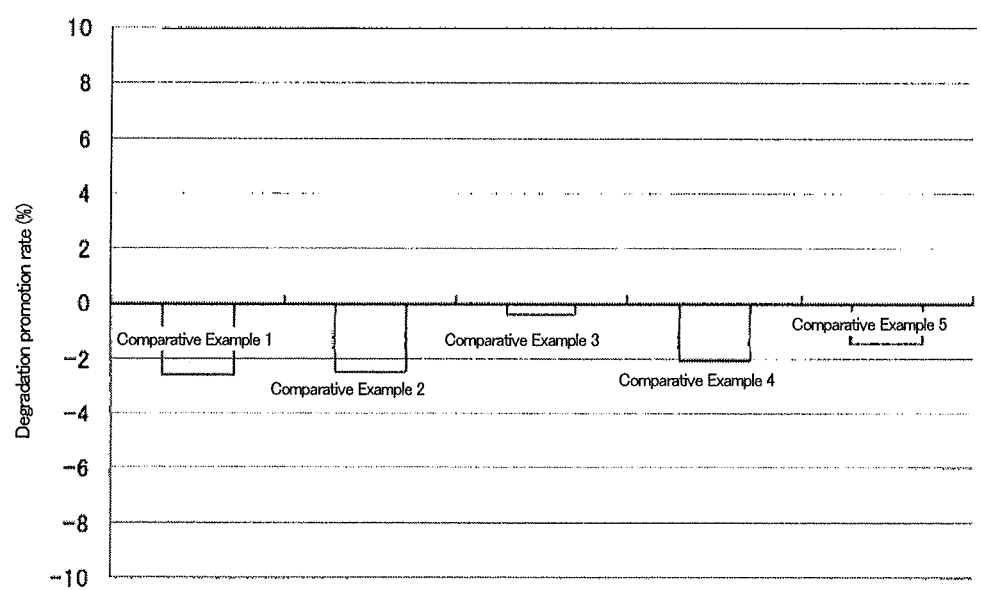
FIG. 3 shows the results of measuring the degradation promotion rate of biodegradable resin molded bodies (inner bags) in the biodegradable products (non-exothermic composition-containing products) of Comparative Examples 1 to 5 in Comparative Test Example 1.

FIG. 3 shows the results. The results indicate that the inner bag (resin molded body) degradation was not promoted at all in the products comprising potassium dihydrogen phosphate, magnesium sulfate, manganese sulfate, potassium sulfate, or sodium sulfate (Comparative Examples 1 to 5). These results clearly indicate that the biodegradable resin molded body degradation promotion effect observed in Examples 1 to 4 is a specific effect that can be exhibited only when a specific metal salt, i.e., a chloride salt, is used in combination with an oxidative degradation agent.

Comprehensive Analysis

The above results clearly indicate that chloride salts have an effect of promoting the degradation of a biodegradable resin molded body comprising an oxidative degradation agent, and can be used as a degradation promoter for biodegradable resin molded bodies comprising an oxidative degradation agent. Further, it was confirmed that a combination of a chloride salt and an oxidative degradation agent is also effective as a degradation agent for imparting degradation properties to resin molded bodies.

The invention claimed is:

1. A degradation promoter of an oxidative degradation agent-containing biodegradable resin molded body,
    the degradation promoter comprising a chloride salt, wherein the chloride salt is at least one member selected from the group consisting of alkali metal chloride salts and alkaline earth metal chloride salts, and
    the oxidative degradation agent comprising a rare earth compound.

2. The degradation promoter according to claim 1, wherein the chloride salt is potassium chloride and/or sodium chloride.

3. The degradation promoter according to claim 1, wherein a resin forming the biodegradable resin molded body is polyolefin.

4. The degradation promoter according to claim 1, wherein the oxidative degradation agent comprises a carboxylic acid metal salt and a rare earth compound.

5. A resin molded body degradation agent comprising an oxidative degradation agent and a chloride salt,
    the resin molded body degradation agent being used as an additive for a resin molded body,
    the chloride salt being at least one member selected from the group consisting of alkali metal chloride salts and alkaline earth metal chloride salts, and
    the oxidative degradation agent comprising a rare earth compound.

6. A biodegradable product comprising the degradation promoter according to claim 1 and a biodegradable resin molded body comprising an oxidative degradation agent.

7. A biodegradation promoting resin molded body comprising the degradation agent according to claim 5.

8. A method for degrading a biodegradable resin molded body comprising an oxidative degradation agent, comprising allowing the biodegradable resin molded body to be present with the degradation promoter according to claim 1 to degrade the biodegradable resin molded body.

9. The degradation promoter according to claim 2, wherein a resin forming the biodegradable resin molded body is polyolefin.

10. The degradation promoter according to claim 2, wherein the oxidative degradation agent comprises a carboxylic acid metal salt and a rare earth compound.

11. The degradation promoter according to claim 3, wherein the oxidative degradation agent comprises a carboxylic acid metal salt and a rare earth compound.

12. The degradation promoter according to claim 9, wherein the oxidative degradation agent comprises a carboxylic acid metal salt and a rare earth compound.

13. A biodegradable product comprising the degradation promoter according to claim 2 and a biodegradable resin molded body comprising an oxidative degradation agent.

14. A biodegradable product comprising the degradation promoter according to claim 3 and a biodegradable resin molded body comprising an oxidative degradation agent.

15. A biodegradable product comprising the degradation promoter according to claim 4 and a biodegradable resin molded body comprising an oxidative degradation agent.

16. A biodegradable product comprising the degradation promoter according to claim 9 and a biodegradable resin molded body comprising an oxidative degradation agent.

17. A method for degrading a biodegradable resin molded body comprising an oxidative degradation agent, comprising allowing the biodegradable resin molded body to be present with the degradation promoter according to claim 2 to degrade the biodegradable resin molded body.

18. A method for degrading a biodegradable resin molded body comprising an oxidative degradation agent, comprising allowing the biodegradable resin molded body to be present with the degradation promoter according to claim 3 to degrade the biodegradable resin molded body.

19. A method for degrading a biodegradable resin molded body comprising an oxidative degradation agent, comprising allowing the biodegradable resin molded body to be present with the degradation promoter according to claim 4 to degrade the biodegradable resin molded body.

20. A method for degrading a biodegradable resin molded body comprising an oxidative degradation agent, comprising allowing the biodegradable resin molded body to be present with the degradation promoter according to claim 9 to degrade the biodegradable resin molded body.

* * * * *